United States Patent [19]

Carman

[11] Patent Number: 4,504,302

[45] Date of Patent: Mar. 12, 1985

[54] HOMOGENIZING APPARATUS GLASS MAKING FURNACE AND METHOD OF HOMOGENIZING GLASS

[76] Inventor: Justice N. Carman, 333 Escuela Ave., Apt. #129, Mountain View, Calif. 94040

[21] Appl. No.: 490,979

[22] Filed: Feb. 28, 1983

Related U.S. Application Data

[63] Continuation-in-part of Ser. No. 1,134, Aug. 24, 1981, , and a continuation-in-part of Ser. No. 315,851, Oct. 13, 1981, , and a continuation-in-part of Ser. No. 381,331, May 24, 1982.

[51] Int. Cl.³ .............................................. C03B 5/18
[52] U.S. Cl. ........................................ 65/136; 65/137; 65/346; 65/347; 55/36; 55/159; 55/203
[58] Field of Search ................ 65/135, 136, 137, 337, 65/346, 347, 336; 55/36, 159, 203

[56] References Cited

U.S. PATENT DOCUMENTS

| | | | |
|---|---|---|---|
| 1,678,247 | 7/1928 | Ferngren | 65/347 X |
| 2,465,283 | 3/1949 | Schlehr | |
| 2,781,411 | 2/1957 | Geffcken et al. | 65/335 |
| 2,926,208 | 2/1960 | Eden | 65/135 X |
| 3,109,045 | 10/1963 | Silverman | |
| 3,186,823 | 6/1965 | Novack | 65/347 X |
| 3,244,412 | 4/1966 | Robinson et al. | 263/40 |
| 3,244,495 | 4/1966 | Apple et al. | 65/161 |
| 3,248,206 | 4/1966 | Apple et al. | 65/347 |
| 3,268,321 | 8/1966 | Chapman | 65/183 |
| 3,281,238 | 10/1966 | Bachowski et al. | 55/36 |
| 3,283,055 | 11/1966 | Trethewey | 13/6 |
| 3,320,045 | 5/1967 | Weiss et al. | |
| 3,337,675 | 8/1967 | Descarsin | 13/6 |
| 3,347,096 | 10/1967 | Person | 55/36 |
| 3,358,066 | 12/1967 | Tiede et al. | 13/6 |
| 3,401,536 | 9/1968 | Glaser | 65/1 |
| 3,516,799 | 6/1970 | Dotson | 23/283 |
| 3,519,412 | 7/1970 | Olink | 65/347 X |
| 3,573,337 | 4/1971 | Grimm et al. | 13/33 |
| 3,656,924 | 4/1972 | Chapman et al. | 65/330 X |
| 3,717,450 | 2/1973 | Loughridge et al. | 65/347 X |
| 3,844,738 | 10/1974 | Reinhoudt et al. | 55/36 |
| 3,938,981 | 2/1976 | St. John | 65/134 |
| 3,996,027 | 12/1976 | Schnell et al. | 55/36 |
| 4,061,031 | 12/1977 | Grimsrud | 55/36 |
| 4,155,731 | 5/1979 | Byrnes et al. | 13/6 |
| 4,185,980 | 1/1980 | Hiaze | 65/1 |
| 4,195,982 | 4/1980 | Concoulas et al. | 65/134 |

Primary Examiner—Arthur Kellogg

[57] ABSTRACT

A glass making furnace wherein the glass constituents are fed from a hopper (10) into a melting chamber (15). Molten glass flows into the chamber (16) for passage through a homogenizer (25) for shear mixing of the glass and elimination of bubbles therefrom. A flow modulating valve (50) regulates the rate of flow of the molten glass to an extrusion nozzle (93).

12 Claims, 6 Drawing Figures

HOMOGENIZING APPARATUS GLASS MAKING FURNACE AND METHOD OF HOMOGENIZING GLASS

RELATED PATENT APPLICATIONS

This application is a continuation-in-part application of PCT application Ser. No. PCT/US 81/01134 filed on Aug. 24, 1981, U.S. application Ser. No. 6/315,851 filed Oct. 13, 1981 and U.S. application Ser. No. 6/381,331 filed on May 24, 1982.

FIELD OF THE INVENTION

This invention relates to homogenizing viscous liquids and removing bubbles therefrom, and more particularly it relates to glass making furnace apparatus.

BACKGROUND OF THE INVENTION

The problem of inhomogeneity of liquids pervades many industries, such as paint, plastics, petroleum, glass, foods, pharmaceuticals and medical. In order to choose the most effective means of of mixing it is helpful to understand the scale and nature of the inhomogeneity. Liquids dissolving solids is a common situation. When one or both of the constituents are viscous the rate of solution can be slow. Heat increases that rate simply by reducing the viscosity. Mechanical mixing can increase that rate still more. Mechanical mixing is typically on a gross scale however when applied in certain ways known as high shear mixing, homogeneity on a microscopic scale can also be enhanced. Concrete as well as certain foods are mixed on a coarse scale. Paint, plastics and most foods must be homogeneous on a macroscopic scale which requires blending or ultrasonic mixing. Some plastics, pharmaceuticals and particularly optical glass become homogeneous on the molecular or atomic scale only with time for diffusion, a phenomena which is quite temperature dependent.

Glass must be homogeneous at all of these levels, that is, the molecular, microscopic, macroscopic and bulk scales; dimensionally this means from a few tens of angstroms through the micrometer range and larger. Homogeneity in glass is accomplished in three general ways; first the constituent materials are usually dry mixed by blending and often by also milling, secondly, after mixing during melting by convection stirring sometimes enhanced by various means of agitation, and thirdly by diffusion.

The properties of different types of glass are obtained by the selection and proportions of the various metallic oxides used. Furnace lining materials normally are also a mixture of metallic oxides. In spite of the fact that the lining composition is chosen so as to minimize its solubility in the glass, some erosion occurs anyway. The solution of the lining changes the glass composition and properties, creating inhomogeniety, stones and cords and eventually destroys the lining. As the fining temperature is increased the glass viscosity decreases thereby allowing bubbles to rise faster and chemical reactions to proceed faster to allow the fining time to be reduced. Unfortunately the increased temperature also increases the erosion rate of the furnace lining to increase inhomogeniety and reduce furnace life. These conflicting phenomena have forced a compromise in prior glass making apparatus.

The limitations imposed by erodable furnace wall materials can be substantially eliminated by the use of a crucible with nonerodible walls such as platinum (often alloyed with iridium or rhodium). Precision glass formulations are made this way but only small sized furnaces are feasible because of the cost of the platinum. Tungsten, rhenium and molybdenum are less expensive but oxidize at glass melting temperatures in the presence of oxygen, however, when submerged beneath liquid glass little or no oxidation or other chemical reaction takes place. Molybdenum is used routinely as an electrode material in electrically heated glass tanks. Graphite and silicon carbide are the other principal materials which are substantially unreactive with glass and are used in glass processing apparatus.

Platinum is often used to prevent erosion only at certain key areas in the furnace or in specialized apparatus. For example in U.S. Pat. No. 3,401,536, Apparatus for Melting and Processing Heat-Softenable Mineral Materials, issued Sept. 17, 1968, to Glaser, a chamber or crucible as well as a feeder are fashioned of an alloy of platinum or other material capable of withstanding the high temperature glass. In the apparatus of that patent a reservoir or holding chamber receives molten glass from a melter positioned above the crucible, with the melter receiving marbles of prefined glass from a hopper. The liquid glass passes a combination of baffles which reverse the direction of flow upwardly and over a baffle thus enhancing the removal of gases evolved from the glass.

U.S. Pat. No. 3,337,675, Manufacture of Glass, issued Aug. 22, 1967, to Descarsin, discloses another apparatus utilizing noble metal crucibles, such as platinum. Another furnace apparatus is shown and described in U.S. Pat. No. 3,358,066, Apparatus for Melting and Feeding Heat-Softenable materials, issued Dec. 21, 1967, to Tiede et al. This furnace is designed for producing elements of glass and is constructed of platinum with bushing tips being provided for passage of the glass therethrough. The apparatus employs a stirrer or impeller for mixing the glass to provide a homogeneous mixture. Other apparatus used in manufacturing glass are shown in U.S. Pat. No. 3,268,321, Apparatus for Forming Solid Glassware in a Carbon Die, issued Aug. 23, 1966, to Chapman and U.S. Pat. No. 4,155,731, Fiber Forming Bushing Construction, issued May 22, 1979, to Byrnes et al.

U.S. Pat. No. 3,320,095 issued June 21, 1963 to W. Weiss, et al discloses the use of a gas mixture of 80% argon 20% hydrogen in the processing of quartz to resist the outdiffusion of nitrogen. This mixture sometimes with somewhat less hydrogen has been found useful in the protection of tungsten or molybdenum when being used to melt glass. U.S. Pat. No. 2,871,411 issued Feb. 12, 1957 to W. Geffchen, et al discloses that platinum, tungsten and molybdenum do not react with glass when used as electrodes in heating glass by the Joule effect at frequencies between 500 and 1000 hertz. U.S. Pat. No. 3,015,191 issued Jan. 2, 1962 to P. Arbeit discloses the use of gas bubbling as a means of stimulating circulation in large glass furnaces but does not employ the bubbling technique for the direct mixing of the glass, which technique is very effective.

Copending U.S. patent application Ser. No. 6/370,347 filed on Apr. 21, 1982 and entitled Method and Apparatus for Making Fused Quartz and for Forming Glass Tubing, by the same inventor and owner as this application discloses a "drain valve" used to block the flow of glass from the first chamber to the second chamber while batch vacuum melting takes place.

When that operation has been completed the valve heater is activated, the glass plug is melted from the transfer tube and the glass is drained into the second chamber. That "drain valve" is a device with on-off controls only. The present invention extends that art by introducing variable control and operating both the heating and cooling means concurrently and continuously. The result is continuous control of the rate of flow. It should be further noted that the same control system could be controlling fluid pressure. This is often important for fast response because the time constant of the flow control valve is relatively slow whereas the time constant and viscous response to pressure changes are almost instantaneous.

It is an object of the present invention to provide a new and improved method and apparatus for homogenizing viscous liquids and of separating bubbles therefrom.

It is still another object of the present invention to provide a new and improved method and apparatus using elevated pressure to suppress volatization and to force the partially fined glass through the homogenizer as well as other parts of the furnace.

It is still another object of the present invention to provide an improved system for controlling the flow and thermal extrusion of molten glass through the furnace.

It is still another object of the invention to provide method of salvaging heat energy from hot glass and using it to heat the glass constituents entering the heating zone of a furnace.

It is still another object of the present invention to provide a new and improved support system for a glass melting furnace.

It is still another object of the present invention to provide a new type of thermally controlled valve to control the rate of flow of viscous liquids.

It is still another object of the present invention to provide a new and improved glass cooling device for use in a forehearth of a glass furnace.

It is still another object of the present invention to provide a new and improved conditioning tank for use in the forehearth of a glass furnace.

It is still another object of the present invention to provide and new and improved extrusion nozzle to be used to produce cane, tubing or gobs of glass.

SUMMARY OF THE INVENTION

In accordance with this invention there are provided several mixing methods in a glass making furnace so that homogeneity is achieved at all levels. The combination of baffles and bubbles provide gross mixing. A narrow slit homogenizer provides high shear mixing which is effective at the microscopic scale. The high melting temperature assures that rapid diffusion will complete the homogeneity on the molecular level.

The furnace comprises a feed hopper and melting chamber contained within one pressurized system, the pressure being used to force the glass through its guided flow path and finally through a homogenizer. The pressurized gas is a mixture of argon and about 10% hydrogen used to protect the tungsten parts from oxidation. The gas enters and flows through three areas, the feed hopper, the melting chamber and an array of bubblers where it mixes the glass. The gas from all three sources is exhausted through a condenser-filter and a pressure control valve 32 connected between the feed-hopper and the melting chamber.

The feed hopper, normally only refilled once per day, feeds premixed constituent materials into the melting tank at a continuous rate or a rapidly intermittent one. The melting tank is divided into two zones, an upper zone receives and heats the constituent materials to a temperature well above the melting point. It passes the partially melted material over a baffle arrangement designed to cause the release of most of the unwanted gases. This upper zone includes a heat salvage system and provides the array of bubbles which mix the constituents on a macroscopic level by creating turbulence as the bubbles rise.

The fluid leaves the first or upper zone as it reaches is maximum temperature but is heated still further as it passes through a first part of the homogenizer zone and reaches its final maximum temperature just as it reaches the homogenizer. The homogenizer consists of a conical stack of tungsten rings held in place by a group of pins which also position washer-spacers between the rings, thereby providing very narrow slits typically 100 micrometers wide and up to a hundred or more meters long. As the glass passes through these slits its velocity of flow is greatly increased in the central portion relative to the rate near the walls thereby causing high shear mixing or turbulence. This mixing is on a microscopic scale which combines with diffusion to provide a highly homogeneous liquid glass.

For most purposes, the glass is much too hot to be worked and must be cooled. In order to salvage and use the surplus heat to heat the incoming material, a heat salvage passageway is provided. It directs the glass along the inside wall of a thermally conductive member having a large area including an array of fins which extend into the inflowing constituent materials. The partially cooled glass enters the transfer tube near the top of the passageway and proceeds downward to one of several alternative processing systems with the type depending on the nature of the product being manufactured.

The transfer tube may pass through a flow control valve and terminate in a precious metal extrusion nozzle which directs the hot glass into quenching means for making frit or to a spinerette for making glass wool for insulation. More commonly the hot glass empties into a heat exchanger to cool it to a working temperature and then passes it into a conditioning reservoir for processing into gobs, tubing, rod or fiber.

Although it is possible to operate the preferred embodiment without a flow control valve, its use is considered advantageous at some point in all the variations of glass making furnaces employing pressure. This valve can be located immediately following the homogenizer and around the transfer tube, after the heat exchanger or even in conjunction with the extrusion cavity.

This new kind of valve consists of a thermally conductive transfer tube around which means of cooling and means of heating are provided. As the wall of the transfer tube is cooled a cooler and more viscous layer of glass (or other viscous fluid) builds along the inner side of the tube which, in effect reduces the inside diameter of the tube restricting flow but does not necessarily affect the temperature of the glass that does pass. In many cases thermal control is used to adjust the approximate rate of flow but because of its long response time, pressure adjustments are used for the fine tuning and quick response.

A heat exchanger is used in most forehearth arrangements because homogenizer operating temperatures are most efficient when operated at much higher than the working temperature commonly required to make any product. The heat exchanger can take several forms but the essential requirement is a pressurizable tank including an array of tungsten or molybdenum baffles to interrupt the otherwise smooth flow of glass and to transmit heat from the inner region of the heat exchanger to the surface. This surface, the tank wall, is made of molybdenum or tungsten and is gas cooled. This nonoxidizing gas may be the same mixture of argon and hydrogen used in the melting chamber and is normally returned through a cooler and pump for recirculation.

The forehearth may, and usually does include a conditioning reservoir. Glass coming from the heat exchanger through a flow control valve enters the conditioning tank through a trap to avoid creating any bubbles and to assure that the "new" glass stays near the surface and is lowered into the extrusion cavity or cavities slowly. These cavities may be independently heated so that the surface of tubing, gobs or cane material is hotter than the inner glass or is at least maintained at the optimum temperature. A final feature included in this forehearth is an extrusion nozzle made of platinum having a vertically oscillating plunger in conjunction with it to produce gobs. By including a bell, tubing is produced.

DESCRIPTION OF THE INVENTION

Figure 1:
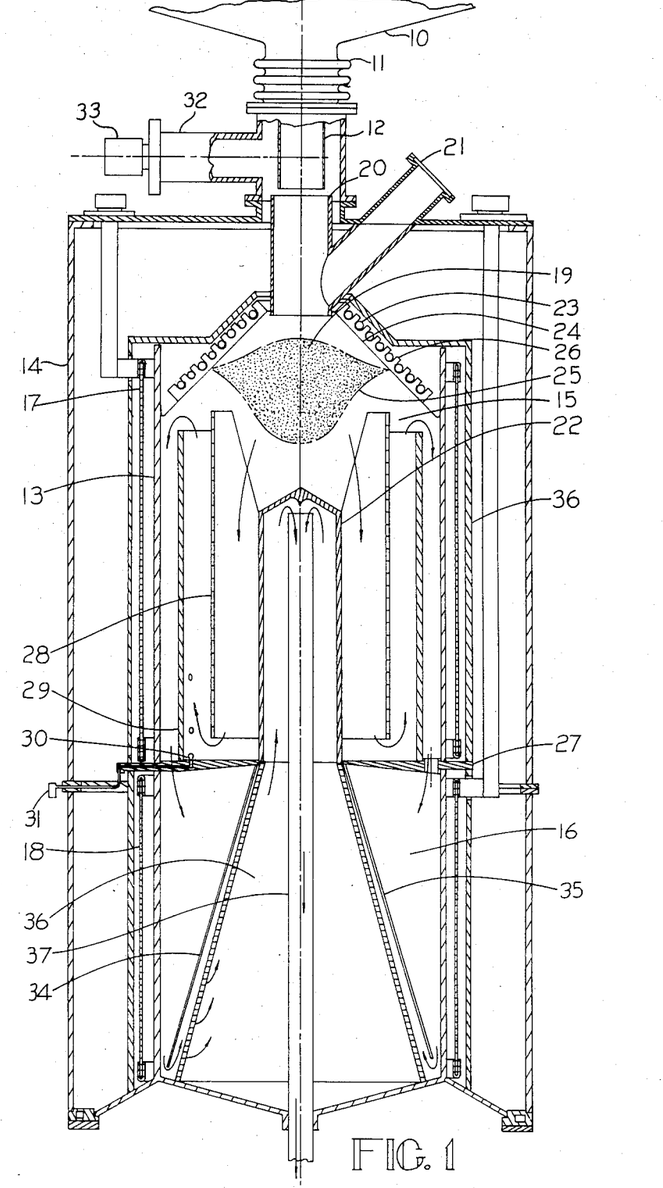
FIG. 1 is a cross sectional view of furnace apparatus extending from bottom of the feed-hopper to the transfer tube for the hot refined glass.

In FIG. 1 is shown a cross-sectional view of that portion of the furnace between the bottom of the feed hopper and the exit point of the hot refined glass. The feed hopper 10 is not shown because it may take a variety of known forms. The primary feature that it must have is the ability to retain a gas pressure up to at least 20 atmospheres. It is connected to the opening 12 leading to the melting tank 13 through a bellows 11 which isolates the vibration from the hopper feed mechanism so that it does not disturb the pressure chamber 14.

The furnace itself is divided into two zones 15 and 16 each supplied with heat energy by heaters 17 and 18 which are independently controlled. The space between the walls of the pressure chamber 14 and the heat shield pack 36 is filled with thermal insulation material. The incoming constituent material 19 enters the chamber through the quartz tube 20 and can be observed through the branch from it that extends toward the window 21. The incoming material builds up on the material being heated and receives energy from two sources, the heat salvage prod 22 below and the conical heater 23 from above. The inner surface 24 of the heater is made of platinum or a platinum alloy so that the reactive constituents which are melting along the periphery of the solid-liquid interface 25 cannot attack it as they would a less inert material. The heater 23 may be made of molybdenum wire of known design supported by an alumina muffle 26. The inverted cone shape at this top surface tends to reduce the tendency for bridging over of packed starting materials. The heat salvage prod 22 does not extend above the liquid level and is chemically unaffected by the melting glass; its other features will be described later.

The glass is gradually melted as it moves downward until it reaches the zone separator 27. At that level, baffles 28 and 29 redirect the glass upward as it passes over the array of bubbler holes 30. A mixture of argon with a few percentage points of hydrogen included, is formed into the glass through feed pipes from a source 31 and bubbles up through the glass for agitating and stirring as it goes. The agitation as the bubbles break through the surface serves the additional purpose of dislodging adherent lumps of unmelted material that might otherwise contribute to bridging.

In order to protect the tungsten or molybdenum used for the heaters and the melting tank, argon containing some hydrogen is fed into the pressure chamber 14 at the same level as the bubbler gas inlet. The flow of both these sources of inert gas must enter with enough pressure to maintain the elevated operating pressure in the furnace. The gases pass up around the quartz tube 20, into the recyclable filter 32 and out through the pressure control valve 33. A third source of nonoxidizing gas flushes through the feed hopper particularly for a short period just after refilling. The top the glass passes over baffle 29, reverses direction and descends along the inside surface of the melting tank 13 through which the glass receives heat from heater 17. It continues down that wall into the second zone where heater 18 brings the glass to its maximum temperature as it passes the end of baffle 34. That, of course, means that the glass viscosity reaches the minimum which raises the efficiency of the homogenizer 35 to a maximum. It is important to realize that the driving force moving the melting glass to this point is not gravity but gas pressure being exerted on the melt surface in the upper zone. That same pressure is now used to force the glass through the homogenizer 25.

Figure 2:
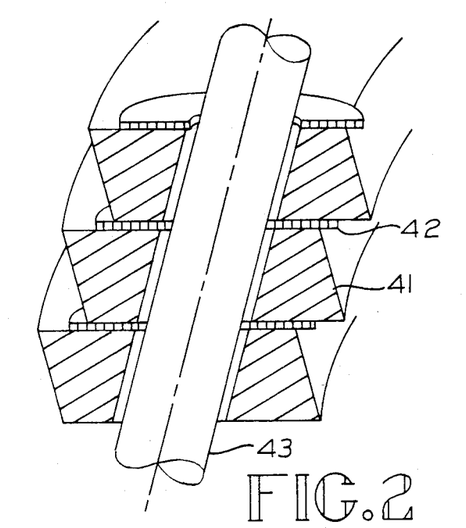
FIG. 2 is an enlarged cross section through homogenizer rings.

The detailed construction of the homogenizer is shown in FIG. 2 as being a construction of a series of large rings 41 held in place by three or more pins 43 extending through holes in the rings and locating the washer-spacers 42 used to precisely separate the rings to establish the width of the slits.

Figure 3:
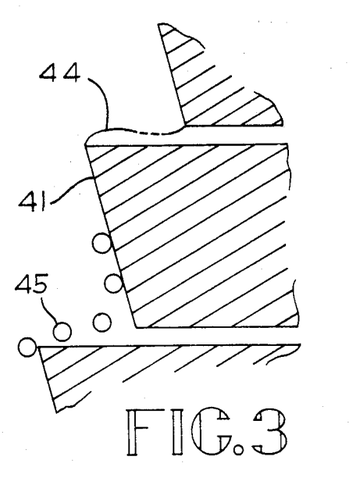
FIG. 3 is a cross section through the homogenizer showing the separation of bubbles and the suction zone.

FIG. 3 illustrates the bubble separation function of the homogenizer. At the expanded scale of this figure a series of bubbles 45 approximately 100 micrometers diameter are shown as they might pass along the outside of the homogenizer 35. The line 44 delineates the region of suction into the slit as the glass enters. If the center of any bubble is within that line it would go through the slit but as one can see this can not happen unless the bubble is very small, in this case 64 micrometers. In most cases any bubble less than about 100 micrometers diameter is unstable because the surface tension of the liquid creates enough pressure in the bubble to cause the gas therein to diffuse into the liquid making the bubble disappear.

Homogenizer dimensions can vary widely, however it is instructive to show one example with typical dimensions; the outside diameter of the largest ring is 300 mm and of the smallest 100 mm; the rings are 1 mm thick and the distance from the outer to the inner diameter is 3 mm thick. The 12 pins holding the rings are 1.2 mm in diameter and the spacers are 80 micrometers thick, 1.5 mm inside diameter by 3 mm outside diameter. If the pressure drop through such a homogenizer is 10 atmospheres and the glass viscosity is 20 poise, 500 kilograms per hour will normally pass through. Also while the homogenizer is described for use in making glass, this invention would be effective in many other applications such as in medicine for separating bubbles from body fluids, in mixing paint, etc.

Returning now to FIG. 1 the "low pressure" zone 36 inside the homogenizer represents the only exit for the liquid glass with the transfer tube forming an exit conduit 37 extending almost to the top of the heat salvage prod or passageway 22. The hot glass must therefore move upwards along the inner surface of the prod to pass heat energy through the highly conductive tungsten wall to the relatively cool constituent ingredients being heated on the outside of the prod. The arrangement of high conductivity baffles 28 are used to increase the rate of heating the constituent materials as they are forced through the first zone 15.

Figure 4:
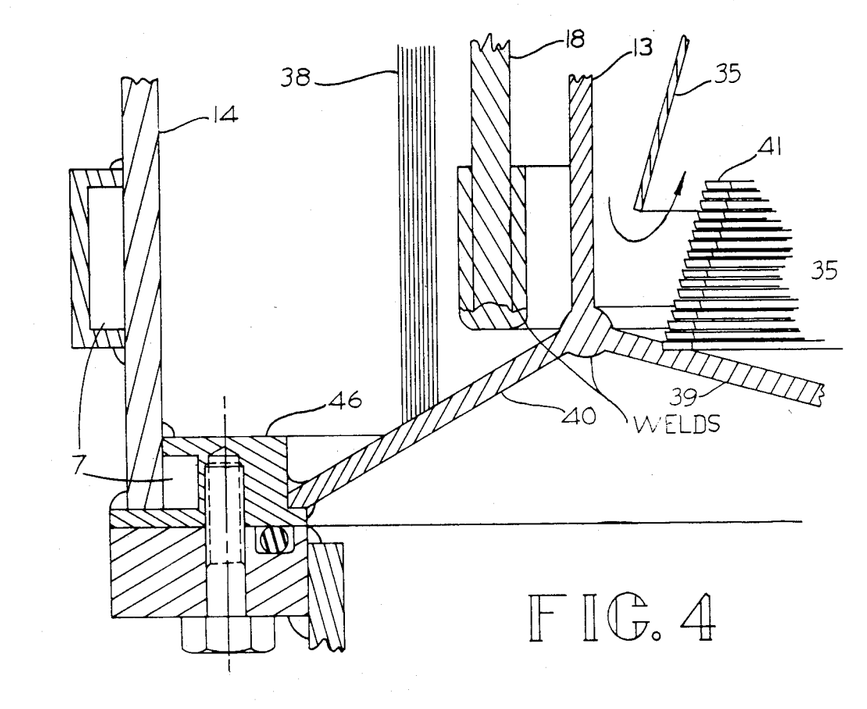
FIG. 4 shows in enlarged detail a cross section of the water cooled pressure chamber, support system, heater and homogenizer.

FIG. 4 is a section view of the mechanical system which supports the melting tank 13, its contents and the homogenizer. Conical support member 40, typically made of tungsten not only supports the weight of the melting tank but also the gas pressure load above it extending through the homogenizer. If that gas pressure is 20 bars at 300 millimeter diameter, the homogenizer carries a load of about 15,000 kilograms. Thus the total load on the tank bottom is about 20,000 kilograms. The conical support member 40 must perform the second function of bridging the large thermal gap between the glass melting tank 13 at as much as 2000 degrees and its periphery which is connected to the chamber bottom 46 which is cooled by circulating water 47 at less than 100 degrees, the metallic bond being at a somewhat higher temperature. As the furnace is being heated this conical support member 40 must withstand the additional forces due to thermal expansion. To minimize the heat loss from the melting tank, especially near the homogenizer, the wall thickness of the tungsten cone must be minimized. For a 350 millimeter diameter melting tank the tungsten is ideally 3 millimeters thick.

Figure 5:
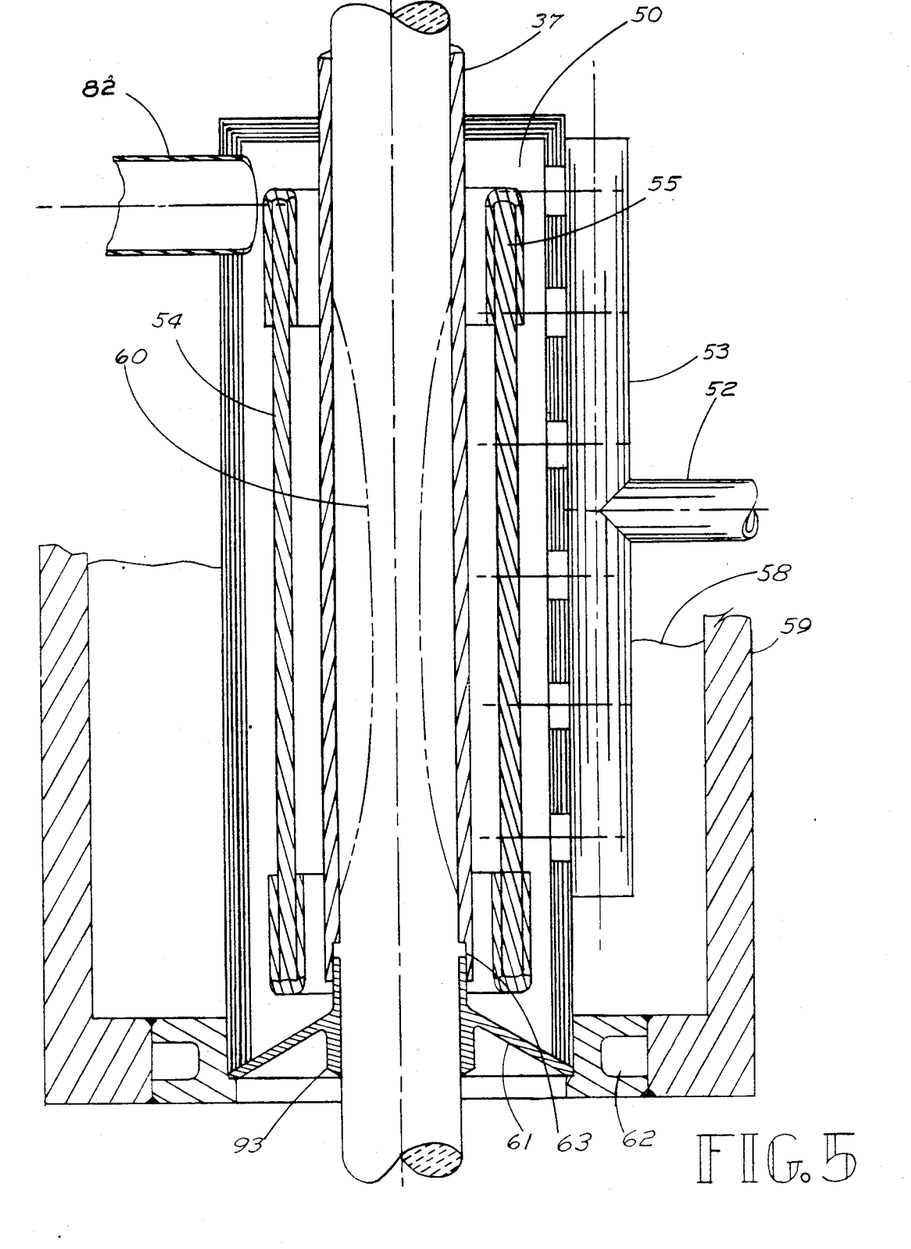
FIG. 5 shows an enlarged cross section of the flow control valve and extrusion nozzle.

FIG. 5 shows the essential features necessary to the operation of the forehearth for the production of glass frit or glass wool. The transfer tube 37 brings the glass from a molten source under pressure through a flow control valve 50 and out from a pressurizable chamber 51 through an extrusion nozzle 93. The highly conductive walls of the tungsten or molybdenum transfer tube are cooled by jets of cool gas entering through an inlet duct 52 and the manifolds 53. A tungsten mesh heater 54 surrounds the transfer tube leaving a plurality of normal open space slits 55 up the sides. The gas jet manifolds 53 are arranged to blow through these slits between the heater segments. The cooling gas remains primarily inside the heat shield pack 56 from which it is exhausted through duct 57 which passes through insulation 58 and chamber wall 59 to a heat exchanger (not shown) where it is recooled and a pump (not shown) returns it to the inlet duct 52.

As the walls of the transfer tube are cooled, a layer of cooler more viscous glass 60 builds up thereby reducing the effective diameter of the tube and attenuating the flow rate without substantially altering the temperature of the glass that does pass. The heater 54 can be activated in the case when glass ceases to flow, for any reason, and becomes solid in the transfer tube. Electric power to the heater may be easier to control than the gas cooling, in either case operation of both allows the other to function against a load. The response time of this type of valve is relatively slow and it is usually helpful to fine tune the flow rate by controlling pressure in the furnace which has a fast response time.

The extrusion nozzle 93 is made of platinum unless the glass being processed has an excessive melting point, in which case either rhodium or iridium are used to resist oxidation from the air as the glass is exposed to it for the first time. The conical shape of the support web 61 maximizes strength as it bridges the wide thermal difference between the hot glass and the chamber wall 59 cooled by water in the passage 62. This web 61 has a relatively thin wall so as to minimize the heat transfer away from the glass. The transfer tube 37 is supported from above whereas the extrusion nozzle is supported from below thereby making it necessary to provide the expansion joint 63 therebetween.

Figure 6:
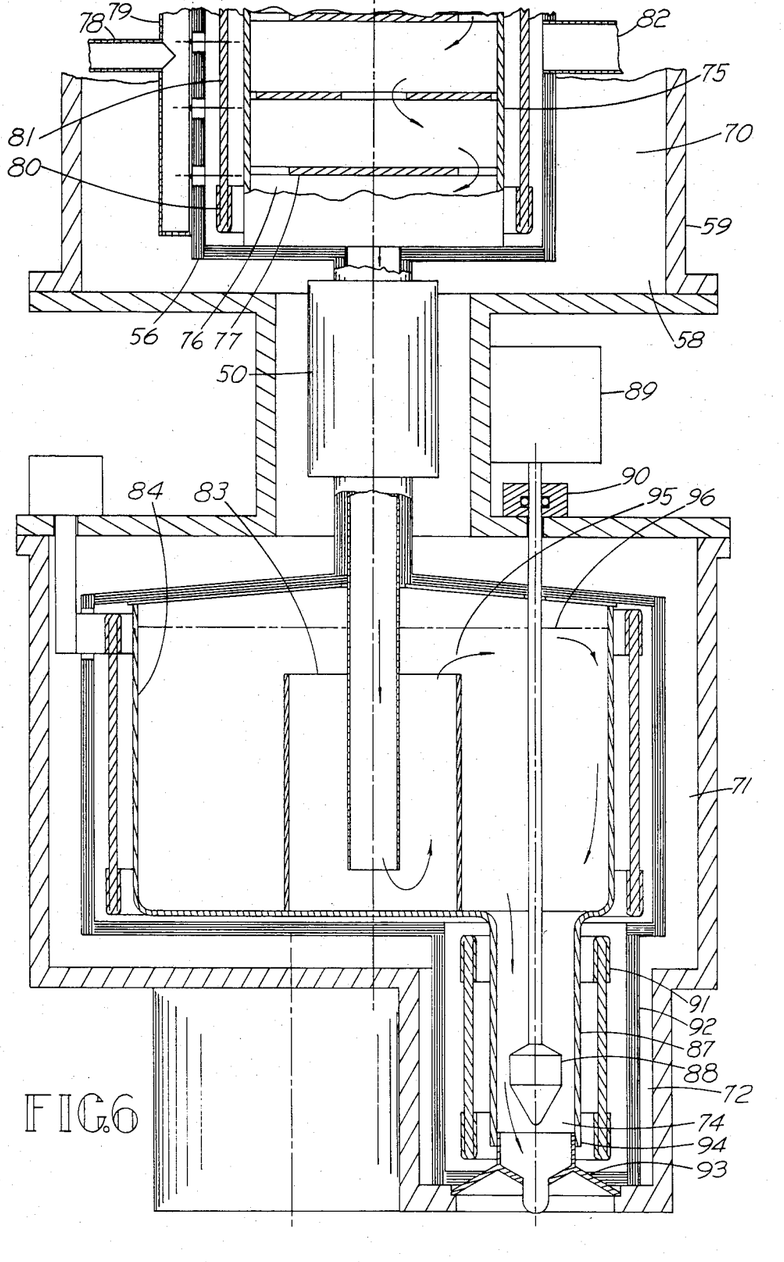
FIG. 6 shows a cross section of the heat exchanger and conditioning tank.

In FIG. 6 is shown a section view of one of the alternate forehearths which incorporates a glass heat exchanger 70, a conditioning reservoir 71 with multiple extrusion cavities 72 and the gob dispenser option 74 and finally extrusion nozzles 93. The top section of the transfer tube 37 (not shown) delivers the hot glass 36 into the top of the glass heat exchanger 70 under modest pressure. The heat exchanger itself consists of a cylindrical molybdenum tank 75 in which two types of baffles 76 and 77 disrupt the flow of the stream of glass and conduct the heat from it to the wall of the tank. Baffles 76 are in sets of 6 or so which mate to maintain vertical orientation as their outer sides mate with the inside wall of the tank. Baffles 77 lie horizontally separated by the vertical baffles 76. Alternately half of the horizontal baffles are discs to block flow down the center while the other half are rings which block flow along the outer periphery of the tank. The net result is a highly turbulent flow of molten glass with a minimum of static flow points.

The highly conductive wall of the cylindrical molybdenum tank 75 is cooled by jets of cool gas entering through an inlet duct 78 and a manifold 79. A tungsten mesh heater 80 surrounds the tank 75 leaving the normal open space slits 81 between the heater sections and up the sides in three places. The cooling gas remains primarily inside the heat shield pack 56 from which it is exhausted through the duct 82 which passes through insulation 58 and the chamber wall 59 to a heat exchanger (not shown) where it is recooled and a pump (not shown) returns it to the inlet duct 78. The heater 80 operates at a low level creating a load for the cooling system to work against to make temperature control more effective. It is also used to melt the glass in the heat exchanger any time that glass ceases to flow.

The glass leaving the heat exchanger enters the extension of the transfer tube 37 and passes through the flow control valve 50 and into the trap 83 in the conditioning reservoir 71. This conditioning reservoir consists of a trap in the center of a large tank 84 provided with a heater 85 and heat shields 86, and three extrusion cavities 87 fitted with a gobbing plunger 88 which is actuated by a controlled drive 89 operating through the pressure seal 90. Preferably the drive 89 is controlled by a computer (not shown). The extrusion cavities 87 are provided with independently controlled heaters 91 and heat shields 92 and fit by way of expansion joint 94 into the extrusion nozzles 93.

The trap 83 remains filled with glass at all times. The flow of glass follows the arrows 95 bringing slowly moving glass into the level 96 of the tank 84 from which it slowly settles downward as it is conditioned, reaching a highly uniform and stabilized working temperature and viscosity. The glass then enters the extrusion cavities 87, the walls of which are either held at a temperature to maintain the glass working temperature or held at a higher temperature so that a thin layer of hotter glass surrounds the glass as it is extruded, thereby compensating for the cooling effects encountered by the glass after leaving the nozzle. The rate of flow through the extrusion cavities is controlled by a combination of geometry, temperature and pressure. Adjustments in temperature have a slow response time and are used therefore primarily to get the optimum glass working temperature whereas pressure can be adjusted with a rapid response time and is the primary means of flow control through the extrusion nozzle. It should be understood that the extrusion cavities can be fitted with nozzles to produce cane, tubing and fiber as well as the gobs that have been shown. Each of these configurations is well known in the industry.

I claim:

1. A homogenizing device for refining viscous liquid comprising:
   a passageway for transmitting the viscous liquid,
   a barrier in said passageway containing a plurality of narrow slits which provide the only route available through which the liquid can flow,
   said barrier slits being formed of a uniform size having a width of between 10 and 150 micrometers; and
   means to create a pressure differential along said passageway to force said viscous liquid through the passageway and through said narrow slits to cause high shear mixing and the separation of bubbles from said liquid.

2. A homogenizer as defined in claim 1 wherein said barrier is comprised of rings all of a uniformly reduced size from the next adjacent ring.

3. A homogenizer as defined in claim 2 wherein said rings have the cross-section of a parallelogram.

4. A homogenizer as defined in claim 1 in which said barrier comprises a plurality of members having front walls and being stacked one above the other;
   a plurality of spacers positioned between said members to form slits therebetween through which the viscous liquid can flow; and
   means to hold said spacers and members in said stacked relationship with each member front wall being positioned back from the front wall of the adjacent supporting member positioned next below to separate bubbles from the viscous liquid flowing into said slits.

5. A homogenizing device for refining viscous liquid comprising:
   a passageway for transmitting the viscous liquid,
   a barrier in said passageway containing a plurality of narrow slits which provide the only route available through which the liquid can flow; and
   means to force said viscous liquid through the passgeway and through said narrow slits to cause high shear mixing and the separation of bubbles from said liquid including means for applying a gas pressure to said liquid for forcing said liquid to flow toward and through said barrier.

6. A homogenizing device for refining viscous liquid comprising:
   a passageway for transmitting the viscous liquid,
   a barrier in said passageway containing a plurality of narrow slits which provide the only route available through which the liquid can flow;
   means to force said viscous liquid through the passageway and through said narrow slits to cause high shear mixing and the separation of bubbles from said liquid including means for introducing a pressurized gas over said viscous liquid to force said viscous liquid to flow through said barrier; and
   means to vary said gas pressure to control the rate of flow of said viscous liquid.

7. A homogenizer as defined in claim 6 including means for heating said viscous liquid to reduce the viscosity thereof.

8. A furnace for refining glass comprising
   a melting tank having walls for holding hot liquid glass;
   a transfer tube for conducting liquid glass from said melting tank;
   a barrier positioned between said tank and said transfer tube containing a plurality of narrow slits which provide the only route available for the liquid to flow therethrough;
   means to force said viscous liquid to flow from said tank through said barrier narrow slits to cause high sheer mixing and the separation of bubbles from said liquid;
   a pressurizable feed hopper for holding glass constituent materials;
   means for conducting the glass constituent materials from said hopper to said chamber;
   a cold wall pressurizable chamber enclosing said melting tank;
   means for maintaining an atmosphere for nonoxidizing gas at a common pressure in said chamber and said feed hopper;
   means for heating the melting tank and the barrier; and
   said melting tank including a plurality of baffles to direct the flow of liquid glass upwards in said melting tank thereby to increase the release of gas from said liquid glass.

9. A forehearth for glass making furnace comprising:
   a walled container;
   a transfer tube for transmitting liquid glass to said walled container;
   a flow control valve including means to cool a portion of said transfer tube to cause a layer of cooler higher viscosity liquid to accumulate on the inside of the transfer tube wall to effectively reduce the size of the passage therethrough and control the rate of flow therethrough;
   means to conduct the liquid glass from the walled container;
   said means of cooling including means for directing a stream of nonoxidizing gas comprising a mixture of nitrogen, argon, and helium with hydrogen onto the transfer tube; and
   means to recirculate and cool said nonoxidizing gas.

10. The method of refining viscous liquids comprising the steps of:
    providing a passageway for transmitting the liquids;

placing a barrier in said passageway comprising a solid walled member having a plurality of small slits therein of small enough size to cause high shear mixing and the separation of bubbles from said liquid; and, causing a pressure differential along said passageway to cause said liquids to flow through said passageway and through said slits for mixing and separation of bubbles from said liquids.

11. The method of making glass comprising the steps of:

providing a melting tank for holding hot liquid glass;

connecting a transfer tube to said tank to conduct the glass from the tank;

placing a barrier forming small slits in said transfer tube;

causing a pressure differential along said transfer tube for forcing the liquid glass to flow through the slits to cause high shear mixing and the separation of bubbles from said liquid.

12. The method as defined in claim 11 including the step of pressurizing the melting tank to regulate the rate of flow of said liquid glass through said barrier.

* * * * *